US010287524B2

(12) United States Patent
Higuchi et al.

(10) Patent No.: US 10,287,524 B2
(45) Date of Patent: May 14, 2019

(54) MODIFIED COAL STORAGE METHOD

(71) Applicant: Kobe Steel, Ltd., Kobe-shi (JP)

(72) Inventors: Toru Higuchi, Hyogo (JP); Takuo Shigehisa, Hyogo (JP); Yoichi Takahashi, Hyogo (JP); Atsushi Furuya, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 30 days.

(21) Appl. No.: 15/305,543

(22) PCT Filed: May 20, 2015

(86) PCT No.: PCT/JP2015/064539
§ 371 (c)(1),
(2) Date: Oct. 20, 2016

(87) PCT Pub. No.: WO2015/178433
PCT Pub. Date: Nov. 26, 2015

(65) Prior Publication Data
US 2017/0044453 A1    Feb. 16, 2017

(30) Foreign Application Priority Data

May 23, 2014    (JP) .................. 2014-107552

(51) Int. Cl.
C10L 5/36        (2006.01)
C10L 9/00        (2006.01)
B65G 3/02        (2006.01)

(52) U.S. Cl.
CPC .............. *C10L 5/366* (2013.01); *B65G 3/02* (2013.01); *C10L 5/36* (2013.01); *C10L 9/00* (2013.01);
(Continued)

(58) Field of Classification Search
CPC . A61M 16/0066; A61M 2205/42; B65G 3/02; C10L 2250/06; C10L 2290/06;
(Continued)

(56) References Cited

U.S. PATENT DOCUMENTS

| 4,941,888 A | 7/1990 | Kramer |
| 5,556,436 A | 9/1996 | Yagaki et al. |
| 5,919,277 A | 7/1999 | Reeves et al. |
| 2003/0069149 A1 | 4/2003 | Adachi et al. |
| 2015/0240178 A1 | 8/2015 | Murota et al. |

FOREIGN PATENT DOCUMENTS

| JP | 48-20201 B1 | 6/1973 |
| JP | 5-230480 A | 9/1993 |

(Continued)

OTHER PUBLICATIONS

International Search Report and Written Opinion dated Aug. 25, 2015 in PCT/JP2015/064539 with English translation. Extended European Search Report dated Oct. 13, 2017 in European Patent Application No. 15796598.9 citing documents AA and AO therein, 8 pages.

*Primary Examiner* — Latosha Hines
(74) *Attorney, Agent, or Firm* — Oblon, McClelland, Maier & Neustadt, L.L.P.

(57) ABSTRACT

A method for storing a modified coal includes a pile forming step of forming a pile by stacking a blended coal of an agglomerate-shaped coal and a powdery modified coal. The modified coal has a content of particles having a particle diameter of 2 mm or less of 35% by mass or more. The pile formed in the pile forming step has a packing density of 1.0 $g/cm^3$ or more.

8 Claims, 4 Drawing Sheets

(52) U.S. Cl.
CPC .............. *C10L 5/361* (2013.01); *C10L 5/363* (2013.01); *C10L 2250/06* (2013.01); *C10L 2290/06* (2013.01); *C10L 2290/08* (2013.01); *C10L 2290/22* (2013.01); *C10L 2290/54* (2013.01); *C10L 2290/547* (2013.01)

(58) Field of Classification Search
CPC ............. C10L 2290/08; C10L 2290/22; C10L 2290/54; C10L 2290/547; C10L 2290/36; C10L 2290/361; C10L 2290/363; C10L 2290/366; C10L 9/00; C10L 5/36; C10L 5/366; C10L 5/361; C10L 5/363; F04D 25/0606; F04D 25/08; F04D 29/083; F04D 29/4226; F04D 29/624; H02K 7/14
See application file for complete search history.

(56) References Cited

FOREIGN PATENT DOCUMENTS

| | | | |
|---|---|---|---|
| JP | 7-233383 | A | 9/1995 |
| JP | 2000-297288 | A | 10/2000 |
| JP | 2001-164254 | A | 6/2001 |
| JP | 2001-303066 | A | 10/2001 |
| JP | 2006077155 | A * | 3/2006 |
| WO | WO 99/32586 | A1 | 7/1999 |
| WO | WO 2014/083918 | A1 | 6/2014 |

* cited by examiner

MODIFIED COAL STORAGE METHOD

TECHNICAL FIELD

The present invention relates to a method for storing modified coal.

BACKGROUND ART

Coal used in a thermal electric power plant, an iron work or the like is usually stored as a pile stacked in an outdoor yard. The coal thus stored produces heat by a reaction with oxygen in the air to sometimes cause spontaneous ignition. In particular, a low-rank coal has high oxidation reactivity because of its porous form and easily produces heat. Therefore, a method of preventing spontaneous ignition by water spraying or the like onto a pile has been generally used. However, since this method requires periodic water spraying, an efficient spontaneous ignition prevention method has been desired.

In such circumstances, as techniques for preventing spontaneous ignition of a coal pile, there have been proposed a method of covering a pile surface with a resin or the like (see JP-A-5-230480 and JP-A-2000-297288) and a method of spraying a surfactant containing a radical trapping agent or an oxygen trapping compound (see JP-A-2001-164254). However, since the above-mentioned respective methods require the resin, the radical trapping agent or the like, there is a concern about a rise in cost.

On the other hand, a production method for obtaining a modified coal from a low-rank coal (porous coal) having a high water content rate and a low calorific value has been developed (see JP-A-7-233383). In this production method, the porous coal is first ground into a granular form, and thereafter, mixed with a mixed oil containing a heavy oil component and a solvent oil component to obtain a raw material slurry. Next, after preheated, the raw material slurry is heated, thereby proceeding with dehydration of the porous coal and impregnating the mixed oil in pores of the porous coal to obtain a dehydrated slurry. Then, after a modified porous coal and the mixed oil are separated from the dehydrated slurry, the modified porous coal is dried (deliquored). The dried modified porous coal is cooled and molded as desired. By this production method, the heavy oil adheres to the inside of the pores of the porous coal, with a decrease in the water content rate of the porous coal, and thus the modified coal having a high calorific value can be obtained.

The modified coal obtained by the above-mentioned production method is molded into briquettes, from the viewpoint of workability including a transport work or from the viewpoint of suppressing dust generation. When the briquettes are stored as a pile, air permeability of the pile is high because it is composed of the briquettes having the same shape. When coal having relatively high oxidation reactivity is piled, or when the height of the pile is increased, a temperature rise of the pile occurs in a relatively short period of time. Accordingly, in such a modified coal, a storage technique which is especially less likely to cause spontaneous ignition is desired.

PRIOR ART DOCUMENTS

Patent Documents

Patent Document 1: JP-A-5-230480
Patent Document 2: JP-A-2000-297288
Patent Document 3: JP-A-2001-164254
Patent Document 4: JP-A-7-233383

SUMMARY OF THE INVENTION

Problems that the Invention is to Solve

The present invention has been achieved under the circumstances described above, and an object thereof is to provide a method for storing modified coal, which can suppress spontaneous ignition of a pile at low cost.

Means for Solving the Problems

The invention which has been achieved in order to solve the above-mentioned problems is a method for storing a modified coal, including a pile forming step of forming a pile by a stacking of an agglomerate-shaped coal and a powdery modified coal, in which the modified coal has a content of a particle having a particle diameter of 2 mm or less of 35% by mass or more, and the pile in the pile forming step has a packing density of 1.0 g/cm$^3$ or more.

In the method for storing modified coal, the modified coal which contains powdery coal and in which relatively small particles having a particle diameter of 2 mm or less account for 35% by mass or more is stacked to form the pile having a packing density of 1.0 g/cm$^3$ or more. In the method for storing modified coal, the modified coal having such a particle size distribution is stacked so that the packing density of the pile achieves the above-mentioned lower limit or more, thereby filling voids with the small particles to form the pile having low air permeability. Accordingly, the method for storing modified coal can suppress spontaneous ignition of the pile at low cost without using a special material and the like.

Before the pile forming step, it is preferred to further add an agglomeration step of agglomerating the modified coal, an aging step of aging the agglomerated coal and a step of blending a powdery modified coal generated in the aging step with the agglomerate-shaped modified coal. By thus blending the powdery modified coal inevitably generated in the aging step with the agglomerate-shaped modified coal, the above-mentioned particle size distribution and packing density of the pile are controlled, and spontaneous ignition of the pile can be suppressed easily and surely. Further, since it is not necessary to agglomerate again the coal generated in the aging step for recycling as in a conventional case, energy necessary for agglomerating again can be reduced.

Before the pile forming step, it is preferred to further add a step of blending a powdery modified coal generated in the agglomeration step with the agglomerate-shaped modified coal. By thus blending the powdery modified coal inevitably generated in the agglomeration step with the agglomerate-shaped modified coal, the above-mentioned particle size distribution and packing density of the pile can be controlled. Thereby, the recovered material generated in the storage process of the modified coal can be more efficiently utilized.

The pile in the pile forming step has an airflow resistance coefficient of preferably 1×10$^7$ Pa·s/m$^2$ or more. By thus adjusting the airflow resistance coefficient of the pile in the pile forming step to the above-mentioned lower limit or more, the airflow volume in the pile is limited to suppress heat generation due to oxidation of the modified coal. Therefore, spontaneous ignition of the pile can be more surely prevented.

The "agglomerate-shaped modified coal" as used herein is a concept including agglomerated modified coal and a ground material obtained by crushing it. Further, the "particle diameter" means a value measured in accordance with dry sieving in the general rule of the sieving test method of JIS-Z8815 (1994). Furthermore, the "airflow resistance coefficient" is a coefficient in a relational expression between the pressure loss per unit length caused by a gas when the gas passes through a carbon particle group and the flow rate of the gas, and a value obtained by dividing the pressure loss (Pa/m) by the flow rate (m/s).

Advantageous Effects of the Invention

As explained above, according to the method for storing modified coal of the present invention, spontaneous ignition of a pile can be suppressed without causing an increase in cost. Accordingly, according to the method for storing modified coal of the present invention, the easiness of use of modified coal obtained from a low-rank coal can be enhanced.

MODE FOR CARRYING OUT THE INVENTION

Figure 1:
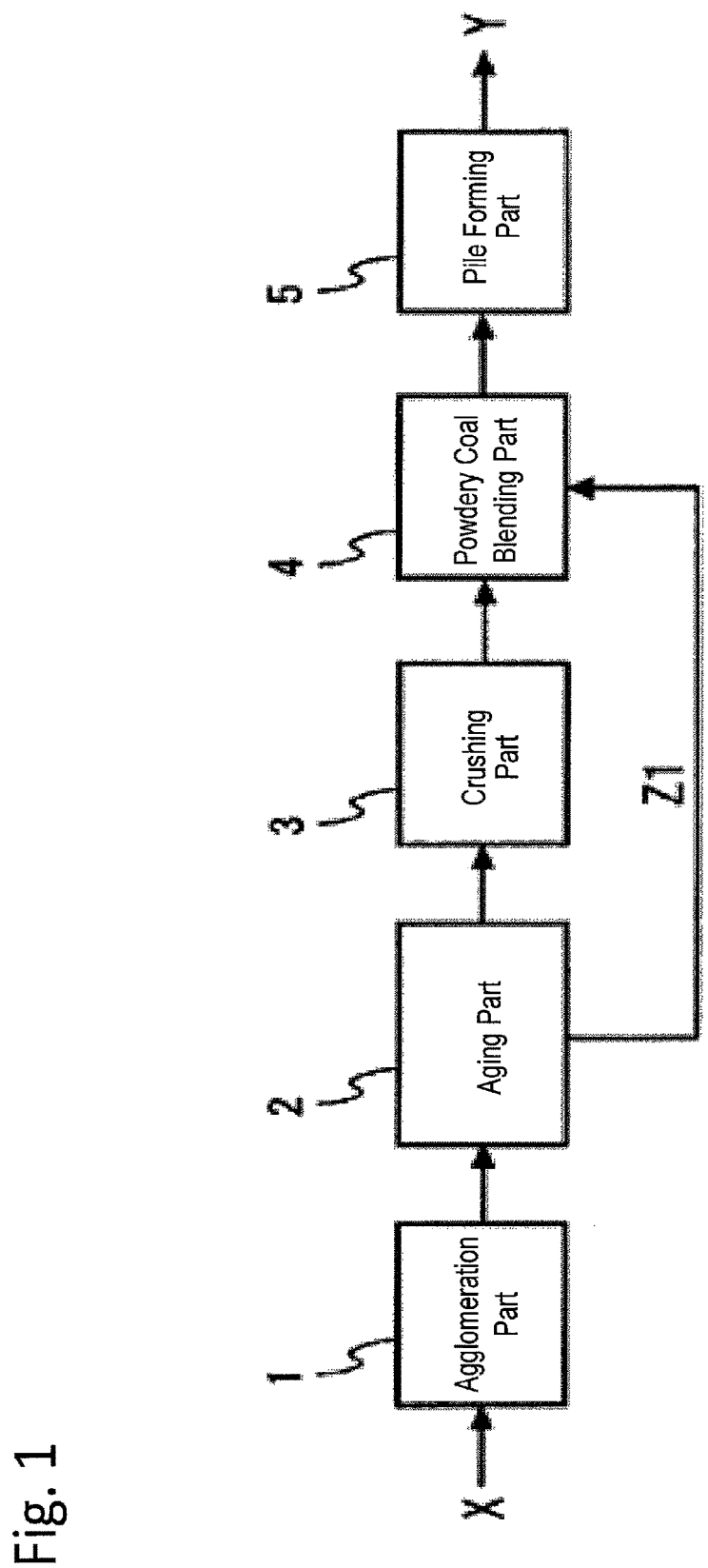
FIG. 1 A block diagram for illustrating a method for storing modified coal according to one embodiment of the present invention FIG. 2 A block diagram for illustrating a method for storing modified coal according to another embodiment of the present invention FIG. 3 A schematic view illustrating an airflow resistance measuring device FIG. 4 A graph showing particle size distributions of respective coals in Examples FIG. 5 A graph showing relationships between the packing density and the airflow resistance measured in Examples

Embodiments of the method for storing modified coal according to the present invention are explained below in detail.
<Method for Storing Modified Coal>
The method for storing modified coal includes a step of forming a pile by a stacking of an agglomerate-shaped coal and a powdery modified coal (pile forming step), and further includes, before the pile forming step, a step of agglomerating the modified coal (agglomeration step), a step of aging the agglomerated coal (aging step), a step of crushing the agglomerated coal after the aging step (crushing step), and a step of blending powdery modified coal generated in the aging step with the agglomerate-shaped modified coal (powdery coal blending step).

First, an example of a production method of modified coal used in the method for storing modified coal is explained herein. The modified coal includes a step of grinding a porous coal (low-rank coal) into a granular form (grinding step), a step of mixing the porous coal and an oil to obtain a raw material slurry (mixing step), a step of preheating the raw material slurry (preheating step), a step of heating the raw material slurry to obtain a dehydrated slurry (heating step), a step of separating the dehydrated slurry into a modified porous coal and the oil (solid-liquid separation step), and a step of drying the modified porous coal separated (drying step).

(Grinding Step)
In the grinding step, the porous coal is ground to obtain ground coal. This grinding can be performed by using a known grinder or the like.

The upper limit of the maximum particle diameter of the porous coal after the grinding is preferably 3 mm, more preferably 2 mm and still more preferably 1 mm. Further, the lower limit of the content of particles having a particle diameter of 0.5 mm or less after the grinding of the porous coal is preferably 50% by mass, more preferably 70% by mass and still more preferably 80% by mass. By adjusting the maximum particle diameter of the porous coal after the grinding to the above-mentioned upper limit or less or the content of particles having a particle diameter of 0.5 mm or less to the above-mentioned lower limit or more, slurrying of the porous coal in the heating step described later can be made easy. The maximum particle diameter of the porous coal can be measured with sieves.

Furthermore, the porous coal is a so-called low-rank coal which contains a large amount of water and is desired to be dehydrated. The water content rate of the porous coal is, for example, 20% by mass or more and 70% by mass or less. Such porous coals include, for example, brown coal, lignite, sub-bituminous coal (Samarangau coal), and the like. In addition, the upper limit of the maximum particle diameter of the porous coal before the grinding is, for example, 50 mm, from the standpoint of ease of introduction into the grinder, although not particularly limited.

(Mixing Step)
In the mixing step, the porous coal ground and the oil are mixed to obtain the raw material slurry. This mixing step can be performed, for example, using a known mixing tank or the like. Further, the above-mentioned oil is preferably a mixed oil containing a heavy oil component and a solvent oil component. Explanation is hereinafter made as an example using the mixed oil.

The heavy oil component is, for example, an oil composed of a heavy component which substantially does not show vapor pressure even at 400° C. or containing a large amount thereof, and asphalt or the like can be used. The solvent oil component is an oil for dispersing the heavy oil component. As the solvent oil component, a light oil component is preferred, from the standpoints of affinity with the heavy oil component, handleability as a slurry, ease of entering into pores, and the like. Specifically, as the solvent oil component, a petroleum-based oil having a boiling point of 100° C. or more and 300° C. or less (such as light oil, kerosene or heavy oil) is preferred.

When such a mixed oil of the heavy oil component and the solvent oil component is used, the mixed oil shows proper fluidity. Because of this, by using the mixed oil, entering of the heavy oil component into pores of the porous coal, which is less likely to be achieved by the heavy oil component alone, is enhanced. The content of the heavy oil component in the mixed oil may be, for example, 0.25% by mass or more and 15% by mass or less.

The mixing proportion of the mixed oil to the porous coal is not particularly limited. For example, the lower limit of the amount of the heavy oil component to the porous coal is preferably 0.5% by mass. Further, the upper limit of the amount of the heavy oil component to the porous coal is preferably 30% by mass and more preferably 5% by mass. When the amount of the heavy oil component is less than the above-mentioned lower limit, the adsorbed amount of the heavy oil component into the pores becomes insufficient, and there is a concern that the effect of suppressing spontaneous ignitability is decreased. On the other hand, when the amount of the heavy oil component exceeds the above-mentioned upper limit, there is a concern that cost for modifying the porous coal is increased.

(Preheating Step)

The raw material slurry obtained in the mixing step is preheated before the heating step. The preheating conditions are not particularly limited, and usually, heating is performed to the vicinity of the boiling point of water under the operation pressure.

(Heating Step)

In the heating step, the raw material slurry is heated to obtain the dehydrated slurry. This heating can be performed by using a known heat exchanger, evaporator or the like. In this case, dehydration of the porous coal proceeds and the mixed oil is impregnated in the pores of the porous coal. Specifically, inner surfaces of the pores of the porous coal are covered with the mixed oil containing the heavy oil component one after another, and the almost whole area of openings of the pores is filled with the mixed oil. It is said that the heavy oil component in the mixed oil is liable to be selectively adsorbed by active points and difficult to separate once it adheres, and therefore the heavy oil component adheres more preferentially than the solvent oil component. Thus, the inner surfaces of the pores are blocked from the outside air, which makes it possible to reduce spontaneous ignitability. Further, a large amount of water is dehydrated and removed, and the mixed oil, particularly the heavy oil component, preferentially fills the inside of the pores. Therefore, an increase in calories as the whole porous coal is achieved.

(Solid-Liquid Separation Step)

In the solid-liquid separation step, the dehydrated slurry is separated into the modified porous coal and the mixed oil. This separation can be performed by using a known centrifugal separator, filter or the like. The mixed oil separated in this step can be reused in the mixing step.

(Drying Step)

In the drying step, the modified porous coal separated is dried. This drying can be performed by using, for example, a known steam tube dryer or the like. The oil (solvent oil component) evaporated in this drying step is recovered, and can be reused in the mixing step.

The modified coal obtained by such a production method has a high calorific value because the water content rate is decreased in the heating step and the heavy oil adheres to the inside of the pores.

The respective steps of the method for storing modified coal are explained below by using FIG. 1.

(Agglomeration Step)

First, in an agglomeration part 1, the modified coal (modified porous coal) X obtained by the above-mentioned production method is agglomerated. The shape of the agglomerated coal agglomerated in the agglomeration part 1 and devices used for the agglomeration are not particularly limited. For example, there can be employed briquettes by compression molding using a double-roll molding machine or the like, pellets by rolling granulation using a pan type granulator or the like, sticks by extrusion molding using an extrusion molding machine, or the like.

The average mass per one piece of the agglomerated coal is not particularly limited, and for example, it can be set to 5 g or more and 50 g or less. Further, the average volume per one piece of the agglomerated coal is not particularly limited, and for example, it can be set to 1 cm$^3$ or more and 100 cm$^3$ or less. Furthermore, the shape of the agglomerated coal is also not particularly limited, and it may be spherical, spheroidal, prismatic, columnar or the like.

(Aging Step)

Then, in an aging part 2, the agglomerated coal is oxidized by allowing it to gradually react with oxygen, thereby performing aging. A method of aging in the aging part 2 is not particularly limited, and a well-known method can be used. Specifically, for example, there can be used a method of introducing the agglomerated coal into a sealed container (anaerobic box), and allowing a predetermined amount of air to flow inside this sealed container from downward to upward.

(Crushing Step)

Next, in a crushing part 3, the agglomerated coal after aging is crushed to obtain modified coal (crushed material) having a small particle diameter. By thus crushing the agglomerated coal once agglomerated to form the modified coal having the small particle diameter, the modified coal having a desired particle size distribution can be easily obtained without introducing a special device or the like.

A method of crushing in the crushing part 3 is not particularly limited, and a crusher or the like may be used. The agglomerated coal may be crushed only by falling down from a high place. For example, by scooping up the agglomerated coal after aging with a wheel loader and allowing it to fall down, or the like, crushing can be performed. In this case, for example, by changing the height, the number of times or the like for the falling, the particle size distribution of the resulting crushed material can be easily controlled.

In the crushing step, the agglomerated coal not crushed may remain in the resulting crushed material. Further, only a part of the agglomerated coal subjected to aging in the aging part 2 may be subjected to the crushing part 3.

(Powdery Coal Blending Step)

Then, in a powdery coal blending part 4, powdery modified coal Z1 inevitably generated in the aging part 2 is blended with the crushed material (agglomerate-shaped modified coal) crushed in the crushing part 3. Here, the powdery modified coal Z1 inevitably generated in the aging part 2 is specifically powdery modified coal recovered under a sieve of the aging part 2 or powdery modified coal which falls down at a transfer part or the like between conveyors after the aging step. By blending the modified coal Z1 with the crushed material at a predetermined proportion, the particle size distribution of the modified coal after blending can be controlled, and the packing density in stacking the modified coal can be increased. The above-mentioned agglomerate-shaped modified coal may contain the agglomerated coal not crushed in the crushing part 3.

For the powdery coal blending part 4, a configuration thereof is not particularly limited, as long as the powdery modified coal (for example, modified coal having a maximum particle diameter of 100 μm or less) can be blended with the agglomerate-shaped modified coal. For example, it can be configured so that the modified coal Z1 is allowed to fall down from a conveyor for conveying the powdery modified coal Z1 recovered under the sieve of the aging part 2 onto a conveyor for conveying the crushed material crushed in the crushing part 3.

The lower limit of the content of particles having a particle diameter of 2 mm or less in the modified coal (blended coal) obtained by blending the agglomerate-shaped modified coal and the powdery modified coal in the powdery coal blending part 4 is 35% by mass and preferably 38% by mass. Further, the upper limit of the content of the particles having a particle diameter of 2 mm or less is preferably 90% by mass and more preferably 80% by mass. When the above-mentioned content is less than the above-mentioned lower limit, voids are not filled with small particles in the case of forming the pile, resulting in high air permeability. There is therefore a concern that spontaneous ignition of the pile cannot be sufficiently suppressed. On the other hand, when the above-mentioned content exceeds the above-mentioned upper limit, the packing density in the case of forming the pile is not sufficiently increased, resulting in an insufficient decrease in air permeability. There is therefore a concern that spontaneous ignition of the pile cannot be sufficiently suppressed.

Further, the lower limit of the content of particles having a particle diameter of 1 mm or less of the blended coal is preferably 27% by mass and more preferably 28% by mass. Furthermore, the lower limit of the content of particles having a particle diameter of 0.5 mm or less of the blended coal is preferably 15% by mass and more preferably 18% by mass. By adjusting the content of particles having a particle diameter of 2 mm or less of the blended coal within the above-mentioned range and moreover adjusting the contents of particles having a particle diameter of 1 mm or less and a particle diameter of 0.5 mm or less of the blended coal to the above-mentioned lower limits or more, the packing density during the pile formation can be increased, and air permeability is reduced. Thus, the effect of preventing spontaneous ignition of the pile can be further increased.

On the other hand, the upper limit of the content of particles having a particle diameter of 1 mm or less is preferably 40% by mass and more preferably 35% by mass. Further, the upper limit of the content of particles having a particle diameter of 0.5 mm or less is preferably 30% by mass and more preferably 25% by mass. By adjusting the contents of these fine particles to the above-mentioned upper limits or less, suppression of dust generation or other workability can be enhanced.

The particle size distribution of the modified coal can be controlled by changing, in the powdery coal blending step, the blended amount of the powdery modified coal Z1 to be blended with the crushed material crushed in the crushing part 3. Further, the particle size may be controlled by adding the agglomerated coal not crushed in the crushing part 3, the modified coal X before agglomeration, or the like. Here, in order to control the particle size of the modified coal, the modified coal X before agglomeration may be ground into a powdery form and blended with the crushed material. Furthermore, in the powdery coal blending step, the particle size of the whole can also be controlled by using unmodified coal. However, the upper limit of the blending proportion of the unmodified coal to the blended coal is preferably 30% by mass and more preferably 10% by mass. When the blending proportion of the unmodified coal exceeds the above-mentioned upper limit, there is a concern that combustion efficiency of the coal is decreased.

(Pile Forming Step)

Next, in a pile forming part 5, the blended coal in which the agglomerate-shaped modified coal and the powdery modified coal are blended in the powdery coal blending part 4 is stacked to form a pile Y. This stacking can be performed by using a known device or the like, such as a conveyor belt.

The lower limit of the packing density of the pile Y formed in the pile forming part 5 is 1.0 g/cm$^3$, preferably 1.03 g/cm$^3$ and more preferably 1.05 g/cm$^3$. When the packing density is less than the above-mentioned lower limit, air permeability is increased, and there is a concern that spontaneous ignition of the pile Y cannot be sufficiently suppressed. The packing density of the pile Y is the bulk density of the pile Y.

On the other hand, the assumed upper limit of the packing density is about 1.4 g/cm$^3$ in a water-free state. Realistically, however, it is difficult to think that the packing density exceeds 1.2 g/cm$^3$ of the density of briquettes. Because of this, the upper limit of the packing density is preferably 1.15 g/cm$^3$ and more preferably 1.10 g/cm$^3$.

Further, the lower limit of the airflow resistance coefficient of the pile Y formed in the pile forming step is preferably $1 \times 10^7$ Pa·s/m$^2$ and more preferably $3 \times 10^7$ Pa·s/m$^2$. On the other hand, the upper limit of the airflow resistance coefficient is $2 \times 10^9$ Pa·s/m$^2$ and more preferably $7 \times 10^8$ Pa·s/m$^2$. When the airflow resistance coefficient is less than the above-mentioned lower limit, aeration in the pile Y cannot be sufficiently restricted, and there is a concern that spontaneous ignition of the pile Y cannot be sufficiently suppressed. Furthermore, when the airflow resistance coefficient exceeds the above-mentioned upper limit, pile formation becomes difficult, and there is a concern that a special device becomes necessary.

In the pile forming step, stacking is performed by using the modified coal in which the powdery modified coal Z1 is blended, in the powdery coal blending step, with the crushed material crushed in the crushing part 3, so that the pile Y having such a high packing density and a high airflow resistance coefficient can be formed easily and surely.

The modified coal may be stacked while performing tapping or the modified coal may be stacked and thereafter trodden with heavy machinery so that the packing density and the airflow resistance coefficient of the pile Y fall within the above-mentioned ranges.

Further, when the modified coal is stacked, water or an aqueous surfactant solution may be sprayed onto the modified coal. Thus, dust generation or ignition from the formed pile Y can be reduced.

<Advantages>

In the method for storing modified coal, the modified coal which contains powdery coal and in which relatively small particles having a particle diameter of 2 mm or less account for 35% by mass or more is stacked to form the pile having a packing density of 1.0 g/cm$^3$ or more. Thereby, voids are filled with the small particles to form the pile having low air permeability, thus suppressing spontaneous ignitability. As described above, the method for storing modified coal can suppress spontaneous ignition of the pile at low cost without using a special material and the like.

Further, in the method for storing modified coal, the powdery modified coal inevitably generated in the aging step is utilized for formation of the pile. It becomes therefore unnecessary to agglomerate again the powdery coal generated in the aging step for recycling as in a conventional case, which makes it possible to reduce cost for recycling.

Another Embodiment

Figure 2:
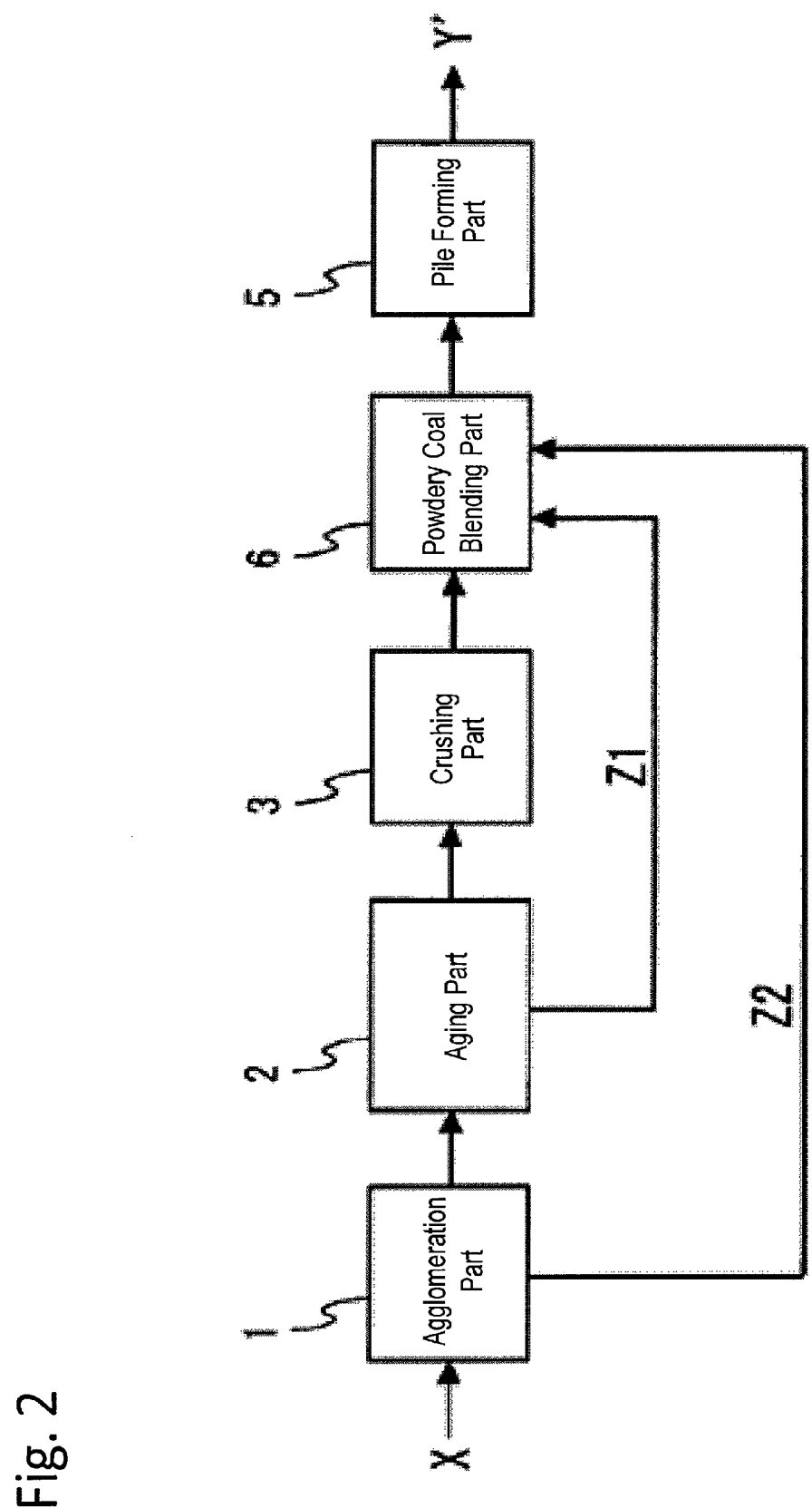

In the above-mentioned embodiment, the powdery modified coal inevitably generated in the aging step is utilized for formation of the pile. However, the powdery modified coal inevitably generated in the agglomeration step may also be further utilized for formation of the pile. FIG. 2 is a block diagram for illustrating the method for storing modified coal, in which the powdery modified coal inevitably generated in the agglomeration step is also utilized for formation of the pile. In FIG. 2, the same reference numerals are given to the same configuration parts as in FIG. 1.

In the powdery coal blending step in the method for storing modified coal illustrated in FIG. 2, powdery modified coal Z2 (defective agglomerated product) inevitably generated in the agglomeration part 1 is also blended with the crushed material crushed in the crushing part 3, together with the powdery modified coal Z1 inevitably generated in the aging part 2, in a powdery coal blending part 6. The particle size distribution of the blended coal can be adjusted within the above-mentioned range by blending the powdery modified coal Z1 and the modified coal Z2 with the crushed material at a predetermined proportion in the powdery coal blending part 6. By stacking the blended coal thus obtained by blending in the powdery coal blending part 6, a pile Y' having a high packing density and a high airflow resistance coefficient is formed easily and surely in the pile forming step.

<Advantages>

In the method for storing modified coal, the powdery modified coal inevitably generated in the agglomeration step is also utilized for formation of the pile as the coal to be stacked, so that the recovered material inevitably generated in the storage process of the modified coal can be more efficiently utilized.

EXAMPLES

The present invention will be explained below in more detail by Examples, but the present invention should not be construed as being limited to these Examples.

Example 1

Powdery modified coal was blended with ground coal (agglomerate-shaped modified coal) obtained by grinding agglomerated coal with a crusher at a peripheral speed of 21 m/s, the agglomerated coal being obtained by agglomerating granular modified coal, to prepare test coal of Example 1. In Example 1, 77.7% by mass of the ground coal and 22.3% by mass of the powdery coal were blended to produce the test coal.

Example 2

Agglomerated coal obtained by agglomerating granular modified coal, ground coal obtained by grinding the agglomerated coal with a crusher at a peripheral speed of 21 m/s and powdery modified coal were blended to prepare test coal of Example 2.

Comparative Examples 1 to 3

Ground coal obtained by grinding agglomerated coal with a crusher, the agglomerated coal being obtained by agglomerating granular modified coal, was used as test coal of Comparative Examples. Specifically, ground coal obtained by changing the peripheral speed of the crusher during grinding to three types (15 m/s, 18 m/s and 21 m/s) was used as test coal of Comparative Examples 1 to 3.

<Measurement of Particle Size Distribution>

Figure 4:
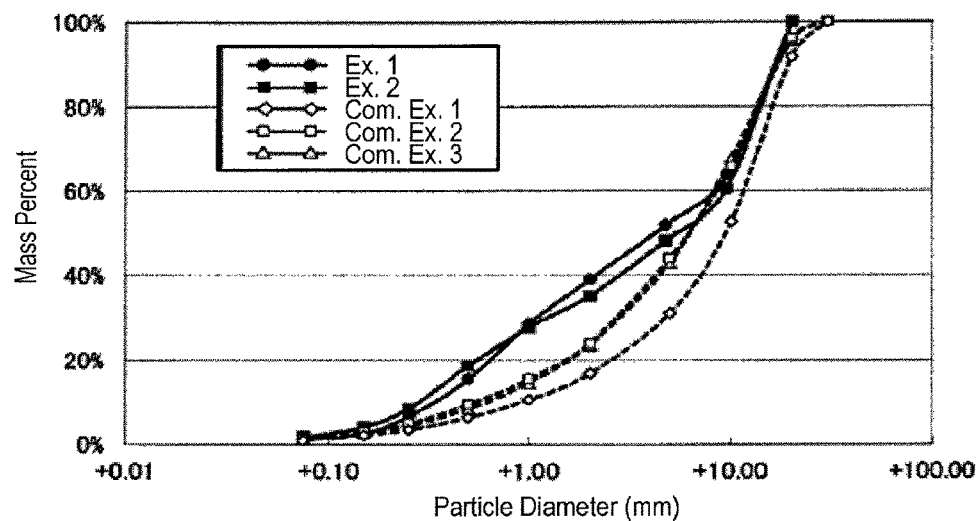

The measurement results (Examples 1 and 2 and Comparative Examples 1 to 3) of the particle size distribution of each test coal of Examples 1 and 2 and Comparative Examples 1 to 3 packed in a measuring container 11 are shown in FIG. 4 and Table 1. The particle size distribution is a value analyzed by using a vibrating sieving machine manufactured by FRITSCH.

TABLE 1

| | PSD Analysis (wt %) | | | | | | | | | |
|---|---|---|---|---|---|---|---|---|---|---|
| | 0.075 | 0.15 | 0.25 | 0.5 | 1 | 2 | 4.75 | 9.5 | 20 | 30 |
| Example 1 | 1.02 | 2.50 | 6.62 | 15.51 | 28.50 | 38.92 | 51.71 | 63.79 | 100.00 | 100.00 |
| Example 2 | 1.69 | 4.09 | 8.56 | 18.68 | 27.72 | 35.11 | 48.01 | 60.52 | 100.00 | 100.00 |
| Comparative Example 1 | 1.00 | 2.10 | 3.50 | 6.33 | 10.64 | 16.82 | 30.95 | 52.60 | 91.76 | 100.00 |
| Comparative Example 2 | 1.40 | 3.00 | 4.86 | 9.53 | 15.53 | 24.00 | 44.00 | 65.80 | 96.10 | 100.00 |
| Comparative Example 3 | 1.20 | 2.60 | 4.47 | 8.47 | 14.69 | 23.58 | 42.85 | 67.77 | 95.58 | 100.00 |

<Airflow Test>

Then, as an airflow test, there was measured the airflow resistance coefficient at the time when each test coal was stacked. It is difficult to measure the airflow volume of a gas which flows in a pile with an actual pile. However, the airflow volume is proportional to the airflow speed, and the airflow speed is restricted by an increase in airflow resistance. That is, the degree of the airflow volume can be confirmed from the degree of the airflow resistance. Accordingly, the airflow resistance coefficient was measured as an index thereof.

Figure 3:
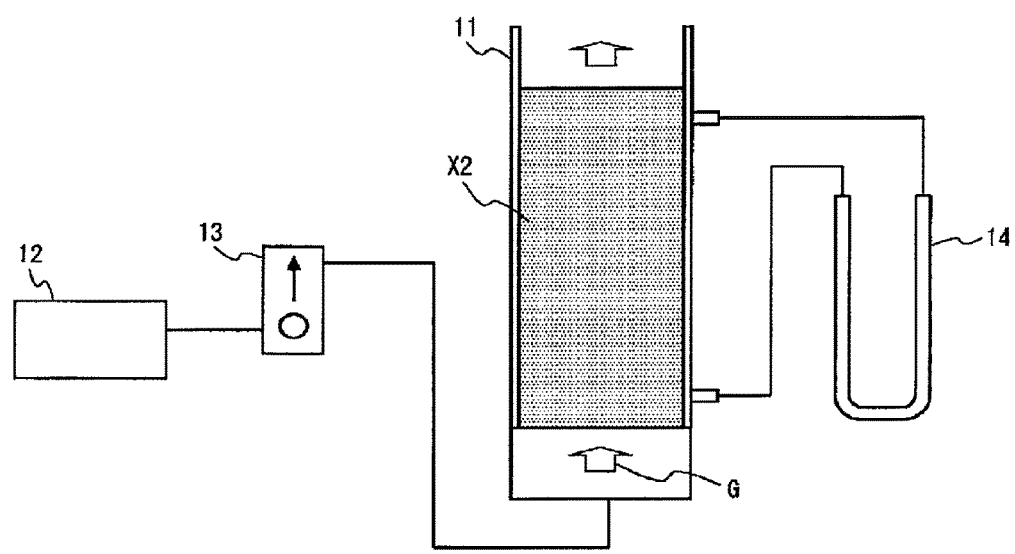

The airflow resistance coefficient was measured by using an airflow resistance measuring device of FIG. 3. Specifically, coal X2 for the test was packed in a measuring container 11, and air G was supplied from an air compressor 12 so that the air G flows from a lower part of the coal X2 packed in the measuring container 11 to an upper part thereof. Then, the flow rate of the air G supplied from the air compressor 12 was measured by a flow meter 13, and the pressure difference (pressure loss) between the upper part of the coal X2 and the lower part thereof was measured by a manometer 14. From the pressure loss (Pa/m) and the flow rate (m/s) of the air G obtained herein, the airflow resistance coefficient (Pa·s/m$^2$) in the packed coal X2 was determined.

For each test coal of Examples 1 and 2 and Comparative Examples 1 to 3, the airflow resistance coefficient measured by the airflow resistance measuring device and the packing density (bulk density) of the coal X2 when packed in the measuring container 11 are shown in Table 2. In Table 2, "loose packing" means a state when each coal is packed in the measuring container 11 without performing tapping. Further, "close packing" means a state when each coal is packed in the measuring container 11 while performing tapping thereto. For the test coal of Examples 1 and 2, only the packing density in close packing was measured. Further, the relationship between the airflow resistance coefficient and the packing density, which were measured for each test coal of Examples 1 and 2 and Comparative Examples 1 to 3, is shown in a graph of FIG. 5.

TABLE 2

|  | Airflow Resistance Coefficient (×10$^5$ Pa·s/m$^2$) | | Packing Density (g/cm$^3$) | |
|---|---|---|---|---|
|  | Loose Packing | Close Packing | Loose Packing | Close Packing |
| Example 1 | — | 334 | — | 1.04 |
| Example 2 | — | 3360 | — | 1.04 |
| Comparative Example 1 | 0.125 | 0.415 | 0.82 | 0.87 |
| Comparative Example 2 | 1.32 | 3.34 | 0.86 | 0.94 |
| Comparative Example 3 | 1.35 | 3.04 | 0.84 | 0.91 |

From these results, it is seen that the airflow resistance coefficient at the time when the test coal of Examples 1 and 2 was packed is several tens of times to several hundreds of times higher than the airflow resistance coefficient at the time when the test coal of Comparative Examples 1 to 3 was packed. Thereby, it can be said that the airflow resistance can be drastically increased by blending the powdery coal with the ground coal.

Further, it is seen that the packing density can be easily increased by blending the powdery coal with the ground coal. The packing density in the case where only the powdery modified coal used in the above blending was packed was roughly 0.5 g/cm$^3$ or more and 0.7 g/cm$^3$ or less. The packing density larger than either of the packing densities of only the ground coal and only the powdery coal can be obtained by blending the powdery coal with the ground coal.

Figure 5:
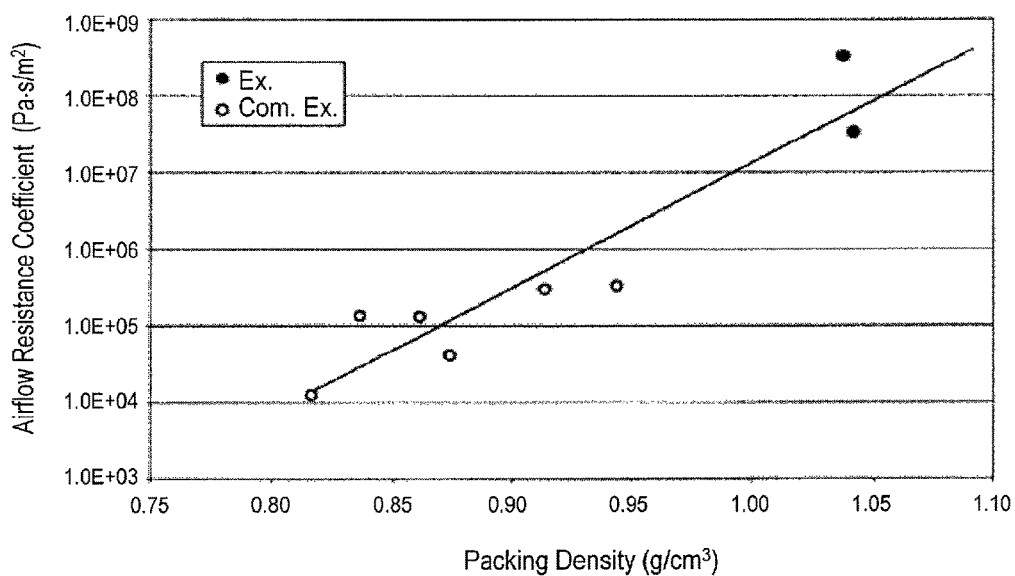

Further, from FIG. 5, it is seen that the more the packing density is increased, the more the airflow resistance is increased. The airflow resistance coefficient for limiting the airflow in the pile for the purpose of suppressing spontaneous ignition is preferably 1.0×10$^7$ or more, and from FIG. 5, it can be said that this condition can be fulfilled by adjusting the packing density of the pile to 1.0 g/cm$^3$ or more.

Furthermore, from the measurement results of the particle size distribution and from the results of the airflow test, it can be said that the content of particles having a particle diameter of 2 mm or less is preferably 35% by mass or more in the particle size distribution of the coal which forms the pile. In addition, it can be said to be preferable that this condition is fulfilled, further that the content of particles having a particle diameter of 1 mm or less is 27% by mass or more, and that the content of particles having a particle diameter of 0.5 mm or less is 15% by mass or more. Moreover, from FIG. 4, it can be said that the packing density of the pile can be increased by blending the powdery coal to the ground coal obtained by grinding with an impact type grinding to increase the proportion of the coal having a particle diameter of 0.15 mm or more and 4.75 mm or less. Thereby, the airflow resistance of the pile is increased, and the airflow volume can be limited. Thus, the effect of suppressing spontaneous ignition of the pile can be improved.

While the present invention has been described in detail and with reference to specific embodiments thereof, it will be apparent to one skilled in the art that various changes and modifications can be made therein without departing from the spirit and scope of the present invention.

The present application is based on Japanese Patent Application (Application No. 2014-107552) filed on May 23, 2014, and the contents thereof are incorporated herein by reference.

INDUSTRIAL APPLICABILITY

As explained above, the method for storing modified coal of the present invention can suppress spontaneous ignition of a pile at low cost, and can be widely used in thermal electric power plants, iron works or the like.

DESCRIPTION OF REFERENCE NUMERALS AND SIGNS

1 Agglomeration part
2 Aging part
3 Crushing part
4 Powdery coal blending part
5 Pile forming part
6 Powdery coal blending part
11 Measuring container
12 Air compressor
13 Flow meter
14 Manometer
X Modified coal
X2 Coal
Y, Y' Pile
Z1, Z2 Powdery modified coal
G Air

The invention claimed is:

1. A method, comprising:
agglomerating a modified porous coal, to generate an agglomerated-shaped coal;
aging the agglomerated-shaped coal, to generate an aged agglomerated-shaped coal;
blending the aged agglomerated-shaped coal with a powdery modified coal, to generate a blended coal; and
forming a pile by stacking the blended coal,
wherein:
the powdery modified coal is generated in the agglomerating step or the aging step;
the aged agglomerated-shaped coal and the powdery modified coal are both brown coal or both sub-bituminous coal;
the blended coal comprises 35% by mass or more of particles having a particle diameter of 2 mm or less; and
the pile has a packing density of 1.0 g/cm$^3$ or more.

2. The method according to claim 1, wherein the pile has an airflow resistance coefficient of 1×10$^7$ Pa·s/m$^2$ or more.

3. The method according to claim 1, wherein the powdery modified coal is generated in the aging step.

4. The method according to claim 3, wherein the pile has an airflow resistance coefficient of 1×10$^7$ Pa·s/m$^2$ or more.

5. The method according to claim 1, wherein the powdery modified coal is generated in the agglomerating step.

6. The method according to claim 5, wherein the pile has an airflow resistance coefficient of 1×10$^7$ Pa·s/m$^2$ or more.

7. The method according to claim 1, wherein the pile has an airflow resistance coefficient from 1×10$^7$ Pa·s/m$^2$ to 2×10$^9$ Pa·s/m$^2$.

8. The method according to claim 1, wherein the pile has an airflow resistance coefficient from 3×10$^7$ Pa·s/m$^2$ to 7×10$^8$ Pa·s/m$^2$.

* * * * *